(12) United States Patent
Kwiat et al.

(10) Patent No.: US 7,877,748 B2
(45) Date of Patent: Jan. 25, 2011

(54) METHOD AND APPARATUS FOR TIMING INFORMATION FLOW IN A DISTRIBUTED SYSTEM

(75) Inventors: Kevin A. Kwiat, Whitesboro, NY (US); Kaliappanadar Ravindran, Belle Mead, NJ (US); Ali S. Sabbir, Forest Hills, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1427 days.

(21) Appl. No.: 11/268,394

(22) Filed: Nov. 2, 2005

(65) Prior Publication Data

US 2006/0130030 A1    Jun. 15, 2006

Related U.S. Application Data

(60) Provisional application No. 60/629,824, filed on Nov. 19, 2004.

(51) Int. Cl.
*G06F 9/46* (2006.01)

(52) U.S. Cl. ....................................................... 718/100

(58) Field of Classification Search ................. 718/100; 709/204
See application file for complete search history.

(56) References Cited

U.S. PATENT DOCUMENTS 6,321,252 B1 *  11/2001  Bhola et al. ................. 709/204
7,594,227 B2 *  9/2009   Inchingolo et al. .......... 718/100

* cited by examiner

*Primary Examiner*—Meng-Ai An
*Assistant Examiner*—Eric C Wai
(74) *Attorney, Agent, or Firm*—Joseph A. Mancini

(57) ABSTRACT

A computer and software method and apparatus for distributed data processing which provides agreement between data sources (sensors) and data sinks (actuators) as to what data has been written into a shared buffer. The invention further provides methods and means for meeting data timeliness requirements. Invention employs a programming primitive which recognizes semantics so as to provide a consistent view of computation modules over prescribed time intervals, called "epochs". Application-level control of the asynchrony and timing of information flow between various computation modules is realized. The invention has applications which include sensor fusion and network gaming.

10 Claims, 10 Drawing Sheets

| Programming primitive | Application program structure | Control of task deadline scheduling | Programming of timing control |
|---|---|---|---|
| TAW | 'dataflow'-style | High (due to extraction of fine-grained parallelism among computations) | Application layer (capability for function reconfigurations) |
| TAW | Monolithically encoded computation | Medium-to-low (due to sequential execution of computations) | Application-layer (limited asynchrony) |
| Ordered Write (Prior Art) | 'dataflow'-style | Medium (synchronization delay due to communication-layer imposed ordering of data) | Communication layer (transcribe function reconfigurations onto message ordering) |
| Ordered Write (Prior Art) | Monolithically encoded computation | Low (severe limitation due to sequential execution of computations and communication-layer imposed ordering of data) | Communication layer (less asynchrony, and no reconfigurability) |

*Figure 9*

METHOD AND APPARATUS FOR TIMING INFORMATION FLOW IN A DISTRIBUTED SYSTEM

PRIORITY CLAIM UNDER 35 U.S.C. §119(e)

This patent application claims the priority benefit of the filing date of provisional application Ser. No. 60/629,824, having been filed in the United States Patent and Trademark Office on Nov. 19, 2004 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to distributed real-time information systems in which the data generated by source modules have timeliness constraints for dissemination by sink modules.

Generally, an embedded system consists of a distributed real-time computation that collects data from the external environment and processes this data to reason about the system behavior [1]. An example is the deployment of radar devices in battle terrains to detect the movement of enemy planes. An application thus involves the processing of time-sensitive data flowing from source modules (see 11, FIG. 1) to sink modules (see 12, FIG. 1), thereby requiring programming-level support to enable a timely processing of data.

The asynchronous execution of data sources and sinks is compounded by the lack of physical shared memory between them (i.e., these modules may be distributed over a network). Given this computation structure, the movement of data to a shared or common buffer (see 13, FIG. 1) over the intervening network should satisfy certain correctness requirements, as follows:

1. The source and sink modules should agree on what data items have been written into the remote buffer at a given point in time for processing;
2. The data generated by a source should be processed by the sinks in a timely manner (i.e., before the data deadline, as prescribed by $\Delta$, expires).

Enforcing the requirements 1 and 2 above allows a consistent view of the processing of data across the various source and sink modules, thereby allowing them to be in step with one another about the flow of application-level computation. From a programming standpoint, the buffer interposed between the sources and sinks to hold data is abstracted as a (logically) shared buffer on which read and write operations occur (see 13, FIG. 1). These operations satisfy some form of atomicity property as part of their semantics. For use in real-time settings, the semantics of read and write should be extended to capture the 'passage of time' in the application. The atomicity augmented with the timing property enforces the required consistency of state in the application-level computation.

The programming-level enforcement of timing and consistency has become a necessity in the evolving application domains of distributed multimedia systems and real-time embedded systems. The prior art provides atomicity of data access operations on a shared buffer only in a 'logical time' framework where the ordering of operations define the forward progress of the underlying computation without any relationship to the time elapsed for these operations. This notion of logical time is, however, difficult to adapt to real-time embedded systems which have their data access operations originate from and culminate on physical systems that form the external environment of the computation subsystems. Therefore, there is a pressing need for programming primitives that accommodate the 'passage of time' as part of the semantics of data access operations.

REFERENCES

[1] H. Kopetz and P. Verissmo. *Real-time Dependability Concepts*, Chapter 16, in Distributed Systems, Ed. S. Mullender, Addison-Wesley Publ., 1993.

[2] A. Singh. Atomic Registers: *Theory and Implementation*, in ACM Transactions on Programming Languages and System, 1993.

[3] M. Singhal and N. Sivaratri. *Distributed Transactions*, Chapter in *Distributed Operating Systems*, McGraw-Hill Publ., 1993.

[4] K. Birman and et al. ISIS/Horus Distributed System, Cornell University Technical Report, 1997.

[5] L. Peterson and et al. x-Kernel system University of Arizona Technical Report, 1995.

[6] J. P. Courtiat, L. Fernando, Rust da Costa Carmo, Roberto Cruz de Oliveira. General-purpose Multimedia Synchronization Mechanism based on Causal Relations. IEEE Journal of Selected Areas in Communications, vol. 14, pp. 185-195, January 1996.

[7] R. Baldoni, R. Prakash, M. Raynal, M. Singhal. Efficient $\Delta$-Causal Broadcasting. International Journal of Computer Systems Science and Engineering, 1998.

[8] S. L. Presti, D. Bert, A. Duda. Tao: Temporal Algebraic Operators for Modeling Multimedia Presentations, Journal of Network and Computer Applications (Elsevier Science Ltd.), vol. 25, pp. 319-342, 2002.

[9] K. Ravindran. Transport-oriented Service Models for Multimedia Data Presentation, proc. SPECTS'00, Vancouver (Canada), July 2000.

OBJECTS AND SUMMARY OF THE INVENTION

The present invention provides a programming primitive that embodies both the atomicity and timing properties of data access operations on a shared buffer and is referred to as 'timed atomic write' (TAW).

The time interval over which a set of time-dependent data items can be processed by the sources and sinks in an application constitutes an epoch. During an epoch, one or more sources write their data items in the buffer as an unordered set, and thereupon, the sinks process various data items from the buffer as determined by the application needs. The reaching of agreement between the various modules as to which data items are processed in a given time interval is subsumed into the notion of epoch. The present invention's TAW primitive allows a programmer to prescribe epochs by stipulating an application-specific timing condition on the data items processed through a shared buffer. It is the responsibility of an application to enforce state consistency across the various modules by exercising a temporal ordering on the epochs. Thus, the TAW primitive enables integrating the 'passage of real-time' and 'state consistency' in an application program through a prescription of epochs.

The TAW primitive is different from 'atomic registers' [2] in that the latter enforces an agreement not only on the set of data items but also on the order in which they will be written into the buffer. With TAW, the application needs to enforce an ordering of data items only to the extent required. Comparing with 'distributed transactions' [3], the latter often determines a serializable schedule on the set of writes on the buffer, which may not be consistent with the application's expected ordering (and hence requires a re-ordering of data items at the application level). With TAW provided by the present invention, however, an application implements its own ordering of data items in the buffer to the extent desired. This entails a higher potential for execution performance of applications. Thus, the TAW may be viewed as providing a thin layer of functionality (i.e., a weaker semantics) as part of the distributed programming abstraction, in comparison with existing works that (implicitly) advocate a thick layer of functionality (i.e., a stronger semantics) with the attendant performance penalty.

Furthermore, unlike the TAW primitive, the prior art works [2,3] do not consider the 'passage of time' as part of an application state. So, a potential use of the existing primitives for embedded systems programming requires a separate sublayer of functionality to integrate 'time' as part of the read-write semantics, thereby entailing inflexibility and complexity in application-level programming.

Thus, the TAW primitive of the present invention, with its explicit application-level control of the asynchrony and timing of information flow between various application modules is highly desirable. The architectural differences in the programming structures that employ the TAW primitive, relative to the existing primitives, are a part of the invention. This present invention provides the structure and semantics of the TAW primitive, and the application-level programming structures using the TAW primitive.

It is therefore an object of the present invention to provide a method and apparatus for agreement on common data and its availability in distributed systems.

It is a further object of the present invention to provide programming primitives which utilize systems semantics in distributive data processing so as to provide a consistent view of common data.

It is still a further object of the present invention to extract parallelism among tasks in distributed system so as to provide for agreement between sensors and acuators about shared data availability and process timelines.

Briefly stated, the present invention achieves these and other objects through a computer and software method and apparatus for distributed data processing which provides agreement between data sources (sensors) and data sinks (actuators) as to what data has been written into a shared buffer. The invention further provides methods and means for meeting data timeliness requirements. Invention employs a programming primitive which recognizes semantics so as to provide a consistent view of computation modules over prescribed time intervals, called "epochs". Application-level control of the asynchrony and timing of information flow between various computation modules is realized. The invention has applications which include sensor fusion and network gaming.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 9 is a table summarizing the benefits of present invention's TAW over a prior art ordered write.

DETAILED DESCRIPTION OF THE PREFERRED EMBODIMENT

Figure 1:
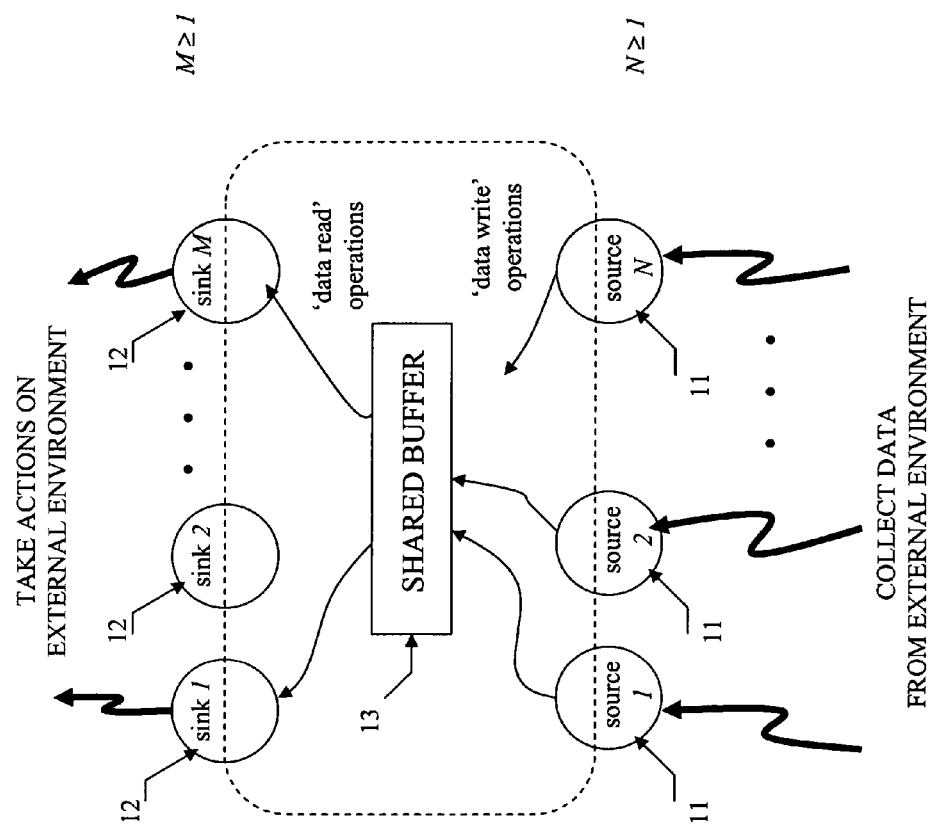
FIG. 1 is a graphical representation of typical operations in real-time embedded systems.

In the present invention, the spontaneity in the arrival of input data for a distributed task, the timeliness of generation of results by the task, and therefore the overall system performance, is inextricable from the parallelism in computing these results. Since each sensor (see 11, FIG. 1) constitutes a distinct unit of data collection for input to the task, the extraction of parallelism in the flow of data through various sub-systems implementing the task should be at the data semantics level. The relevant semantics pertaining to a sensor data item x (see FIG. 2) basically involves identifying the task execution points when x is needed relative to the processing of other data items or the partial results generated therefrom. Such an ordered execution of sub-tasks to process various sensor data items constitutes the processing pipeline associated with the main task.

System Model

Figure 2:
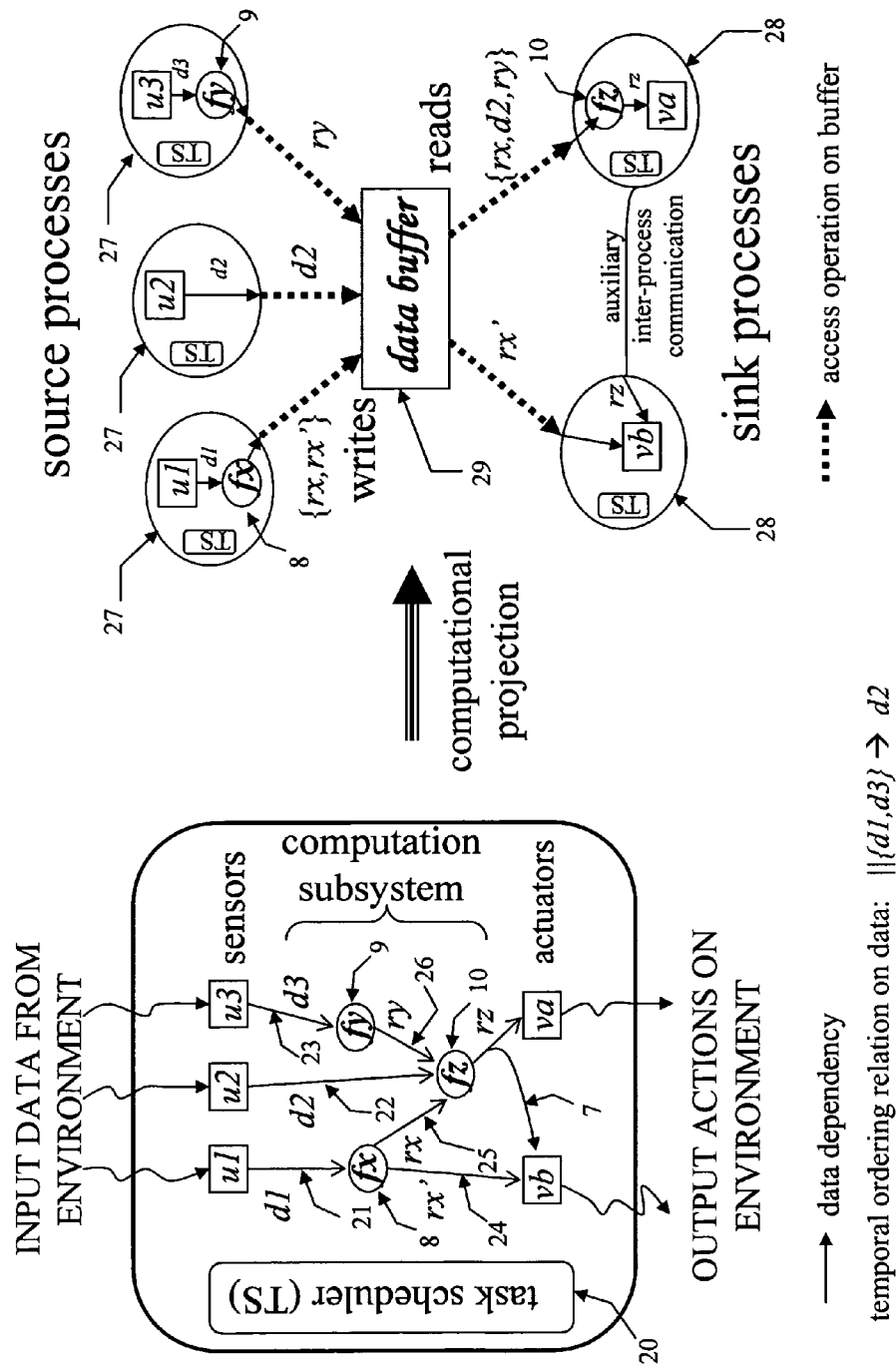
FIG. 2 is a projection of a sample functional embedded system onto its computational realization in a typical distributed programming implementation.

Referring to FIG. 2, u1, u2, uN are the source processes 27 collecting data from the external environment for input to the application task through the shared data buffer 29. The sink processes 28 represented by v1, v2, ..., vM disseminate the results output by the application task onto the external environment (note that N, M≧1). The application task is itself built into computation processes 8, 9, 10 represented by fx, fy, ..., fz that are interposed between the sources 27 and sinks 28. In a given time interval [Ti, Ti+1], a set of sources W generate requests to write into the shared buffer. The processes attempting a write are drawn from a set W' declared as eligible to write during [Ti, Ti+1], i.e., $W \subseteq W' \subseteq \{u1, u2, \ldots, uN\}$. The set of sources W" whose data are actually written into the buffer is then selected from W', i.e., $W'' \subseteq W'$.

The accesses to the shared buffer containing the data items W" are realized through 'read' and 'write' operations exercised in an asynchronous manner.

The computation modules may be either part of the source 27 and/or sink 28 modules or realized on separate nodes of a multi-processor/distributed system. The present invention relies upon the various modules having access to a synchronized real-time clock, at a sufficient level of time granularity (for use by the protocols underlying a TAW realization).

The application task comprises sensors u1, u2, u3 generating data d1, d2, d3, respectively 21, 22, 23, and further comprising a computation subsystem of processes implementing sub-tasks fx, fy, fz, 8, 9, 10 and actuators v1, v2 taking actions on the environment. The use of such an application scenario to simplify the discussions does not however compromise the generality of our model to a case of arbitrary number of sensors and actuators and an arbitrary set of computation modules.

'Dataflow'-Style Programming for Real-Time Tasks

Still referring to FIG. 2, an exemplary programming structure for the present invention is depicted. The interconnections of the various modules depict the 'functional dependency' relationships between them, specifically, the arrow 25 from fx 8 to fz 10 indicates the dependency that fz needs its input data from fx before its computation can start. The module fz starts executing as soon as the inputs 25, 26, 22 from fx and fy and the sensor module u2, respectively, are available. In turn, the output of fz, 7 in conjunction with the output of fy 26, triggers the execution of actuator module vb. Such a 'dataflow'-style program structuring enhances the parallelism in task execution. The input-output relationships of various modules are as shown in the Figure.

In a distributed programming-level implementation, fx and fy are part of the sensor modules u1 and u3 respectively 27 and fz is a part of the actuator module vb 28. The computations fx 8 and fy 9 execute in parallel if the data d1 21 and d3 23 are available, providing their results in a shared buffer 29 for use by fz 25, 26. Since fz also needs the input data d2 22 from u2, the ordering on $\{d1, d2, d3\}$ may be prescribed as: $\|\{d1, d3\} \rightarrow d2$. This ordering is enforced by the computation structure with the use of TAW primitive, as opposed to enforcing the ordering by the communication layer in alternative programming models.

Extraction of Fine-Grained Parallelism

Any application run on the present invention occurs within the context of the input-output relationships between the results produced at various intermediate stages of computation on the input data. The computation may be partitioned into sub-tasks that synchronize their results at appropriate points in the computation. A task dependency graph (TSG) functions as a task scheduler 20 tracks the fine-grained parallelism between various computation modules. The task scheduler 20 ensures the prescribed real-time task deadlines are met. This is functionally possible because of the predictability of execution times of various sub-tasks and the well-defined interconnect structure between them to move the intermediate computation results (note that the task dependency relations form a part of the global knowledge at various computation modules). This parallelism among various sub-tasks itself falls under the realm of application-level programming.

To enable the software construction of such a task "pipeline", the present invention requires a communication primitive with a proper level of abstraction. Such a primitive enables complete utilization of the available parallelism among sub-tasks, but should not in any way limit the programmer's ability to structure these sub-tasks. TAW primitive in the present invention is an enabler for such application-level program constructions.

Structure and Semantics of TAW Primitive

The TAW primitive basically allows writing an unordered set of data items W" into the shared buffer 29. The various sub-tasks embodied in an application program take the required data items from this buffer for processing. The TAW primitive embodies functional requirements to deal with two inter-woven issues that are relevant to the application-level processing of sensor data in a distributed embedded system, these requirements being:

1. Agreement among the sensor and actuator modules as to what data items have been written into the shared buffer (i.e., the modules are provided with a consistent view of what the constituents of W" are);
2. Prescription of the time budget available to process the sensor data items (it allows determining the duration of time interval [Ti, Ti+1]).

The functional requirement 1 is required to deal with the spontaneity in data writes by various sources. Here, spontaneity means that the attempt to write by a source process uj $\in$ W does not have a bearing on that of the other (eligible) sources W-uj. The ensuing concurrency in data collection and/or processing by the sensor and actuator modules, compounded by their potentially distributed realization, needs to be dealt with by a multi-process protocol that is executed by the various modules to reach agreement.

The functional requirement 2 allows determining whether the time required to process various input data items for generating the composite output results meets prescribed deadlines. Often, a data d written into the buffer has real-time constraints $\Delta(d)$ for dissemination, i.e., a time limit $\Delta(d)$ before which d should be acted upon. The task scheduler 20, which may itself be distributed in the various computation modules, makes this determination based on the sub-task execution times and interconnect structure.

The present invention's TAW primitive combined with functional requirements 1 and 2 provide the ability to extract the parallelism among various sub-tasks involved in processing input data and output results.

Programming Model of TAW: Timing Spec

Figure 3:
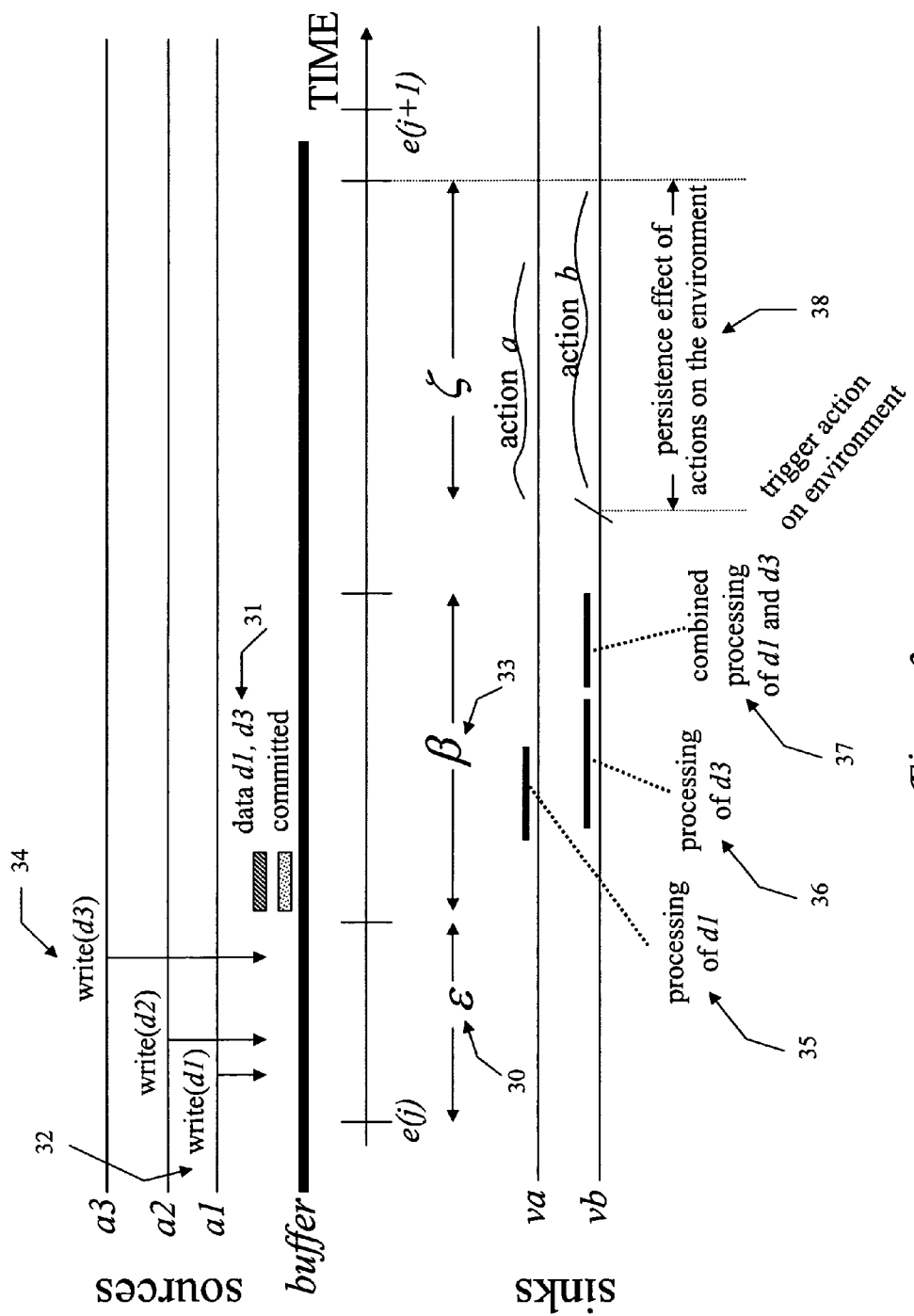
FIG. 3 is a graphical representation of data and timing parameters of a TAW primitive in the present invention.

Referring now to FIG. 3, the temporal axis consists of a sequence of epochs $e(0), e(1), \ldots, e(j), \ldots$, where an epoch $e(j)$ encompasses the write requests generated by one or more sources and their processing over a distinct time interval [Ti, Ti+1]. The duration of $e(j)$ is given by:

$$Ti+1-Ti > \epsilon + \beta + \max(\{\zeta k\}), k=1, \ldots, M$$

where $\epsilon$ 30 depicts the time window during which write requests are generated, $\beta$ 33 is the time needed to process the data generated by the computation sub-system, and $\zeta k$ denotes the persistence time of action triggered by vk 38.

By way of example, consider a temperature control system for a boiler plant that consists of multiple sensors and valves located at different points in the boiler to collect temperature data and to inject coolant liquids respectively. Here, an epoch depicts the time interval for sampling and processing of temperature data where $\epsilon$ is the maximum time skew allowed between the samples of various sensors in a given interval, $\beta$ depicts the time to process temperature data, and $\zeta$ is the time to open (or close) the coolant valves.

The 'passage of time' in an application may be captured by the $\epsilon$ and $\zeta$ parameters, with $\zeta$ viewed as a non-deterministic time duration to model the transition from a current epoch e(j) to the next epoch e(j+1), where $\epsilon, \zeta \gg \beta$.

Programming Model of TAW: Distributed Agreement

Still referring to FIG. 3, the 'write' semantics requires that various processes agree on the set of data items W" actually written into the buffer (a source can write no more than one data item in a given time interval). The sink processes then generate actions based on processing the agreed datum. W"={d1, d3} 31.

A situation may arise where a programming primitive that guarantees agreement (on W") among various modules as part of the read/write semantics is not provided. In the absence of a consistent global knowledge as to what W" is, it is difficult (if not impossible) for the scheduler to precisely determine the actual dependency relations that are satisfied. Consequently, a specific instantiation of the task dependency relations for the writes that are deemed to have occurred, cannot be inferred. This in turn makes it difficult for the task scheduler 20 to determine if the real-time constraints of the task on hand can be met.

The semantics of presenting an unordered set of data items that is consistent across the various computational processes {p1, p2, . . . , pN} enables a 'data-driven' computation in which each process picks up the data items that it needs to accomplish its part of the application-level computation 35, 36 and then produce results to synchronize with that produced by the other processes 37. With data arrivals occurring asynchronously, the non-imposition of any ordering among the data by the communication layer allows the computation modules to start executing as soon as their required input data are committed in the buffer 31. This in turn allows the present invention to benefit from the fine-grained parallelism in the computation, and accordingly enhance the ability to meet real-time deadlines of data.

Program Notations for TAW

A process p housing a sensor ui may invoke a write_buf primitive after its data di becomes available for processing, in the form:

wrtset:=write_buf(di,E,grp,e), where wrtset is the set of successful writes on the buffer in the current epoch e and grp is the broadcast group address to which the process p is subscribed to. Here, $1 \leq |wrtset| \leq nwrt \leq |W'|$, where nwrt is the application-specified maximum number of processes that are allowed to write in the current epoch. The parameter nwrt is made available to the communication layer as part of a control entity in the application program that manages the flow of epochs in the computation. Each element $x \in$ wrtset has 2 fields: x.dt and x.id, denoting the data written in the buffer and the id of process who wrote this data respectively. The case of $ui \in$ wrtset. {id}indicates that the write of ui successfully completed at the buffer, i.e., committed; $ui \notin$ wrtset. {id} indicates otherwise. A process p' housing an actuator vk and subscribed to the group address grp may examine the buffer contents by invoking a primitive of the form:

wrtset:=read_buf(grp,e).

The invocation blocks vk until all the writes selected by the communication layer for the epoch e complete.

The $\epsilon$-parameter provides a time-window over which the competing write requests are collected by the communication layer. The collection takes place until the time-window expires or nwrt requests are collected, whichever occurs earlier. The wrtset contains the set of data items in the shared buffer, as agreed upon by all the processes subscribed to the group address grp.

Benefits of TAW Over Non-Synchronized Data Writes

Figure 4:
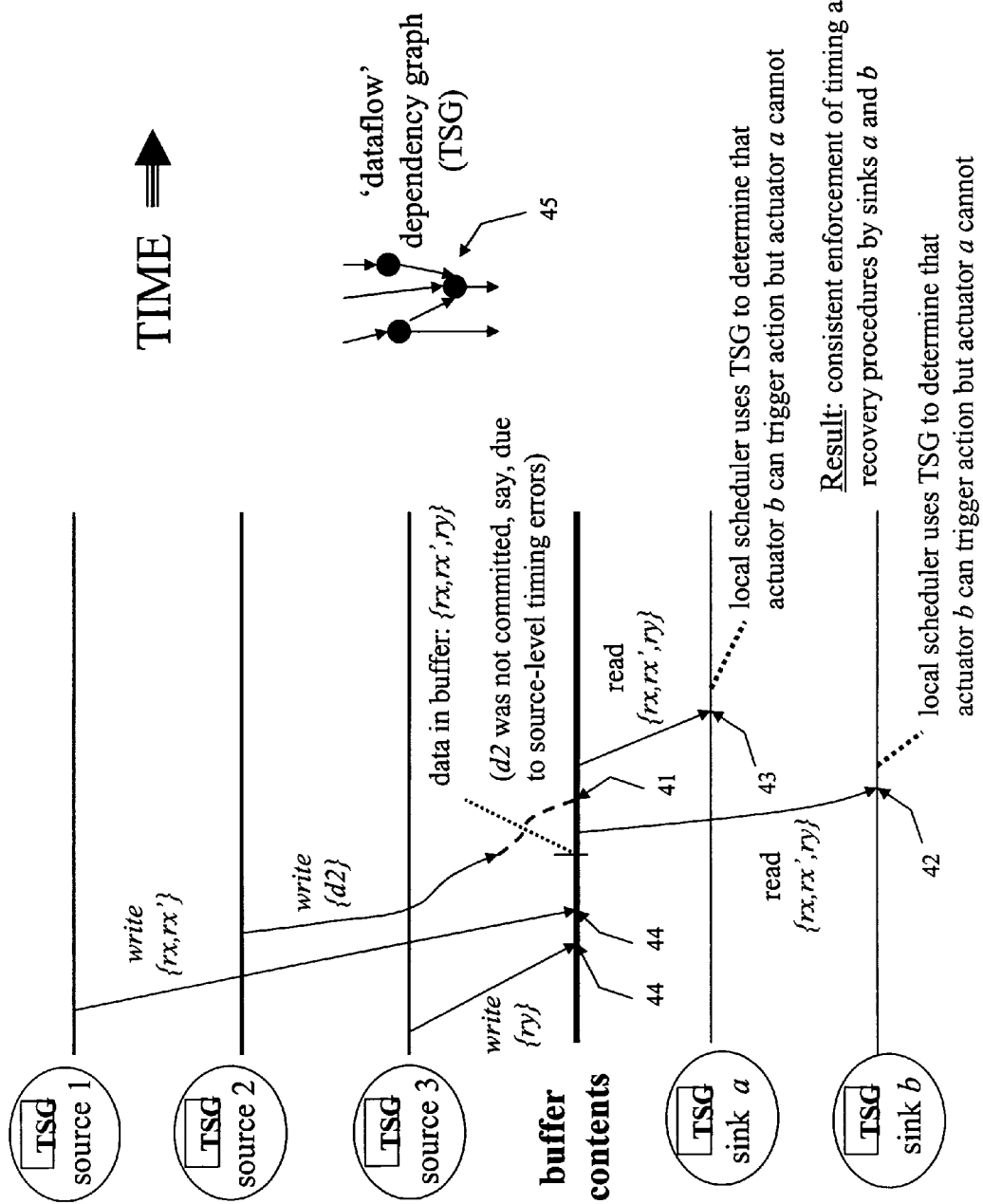
FIG. 4 is a graphical representation of a sample timing scenario of task scheduling employing a TAW of the present invention.

Referring to FIG. 4, the TSG is implemented in a decentralized manner in various processes. The TSG information, combined with an agreement among processes about the data being committed in the current epoch, allows each process in the computation subsystem to have a consistent view of which of the task input requirements have been met. Given that a process P implementing a sub-task is often equipped with recovery procedures to deal with the absence of a data d at its input, P can determine its output that is consistent with the outputs of other processes that also depend on d. The consistency can be achieved without a need for P to coordinate with the other processes about whether they saw d or otherwise. Such a consistent view of processes about the TSG relative to the actual data inputs in the current epoch 45 enhances the ability of processes to determine their local computation schedules relative to the overall task deadline.

Still referring to FIG. 4, a timing scenario depicts the asynchronous arrival of d1, d2, d3, with the arrival of d2 delayed past the initial $\epsilon$-window at fz, due, for example, to source-level timing errors 41. With a non-commit of d2, the present invention consistently decides that actuator vb triggers its action but actuator va does not 42,43. This consistent enforcement of timing and recovery procedures by sinks va and vb.

Figure 5:
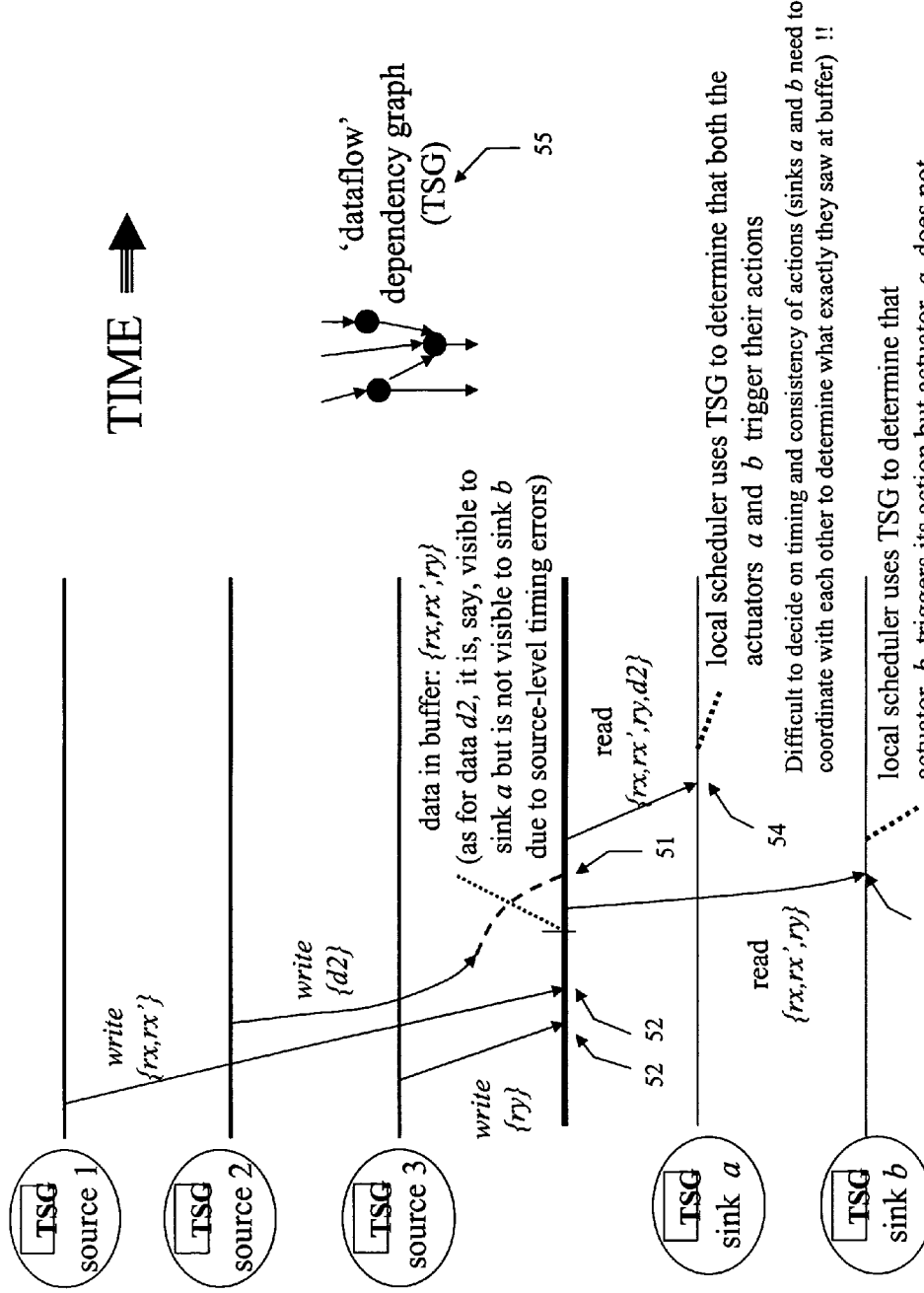
FIG. 5 is a graphical representation of prior art sample timing scenario of task scheduling without any data synchronization such as would be provided by the present invention.

Referring to FIG. 5, a prior art scenario is depicted where no agreement is reached on the non-commit of d2, 51 because unlike the present invention, no TAW-like primitive is available to the programmer. Here, d2 is seen by va but not by vb 53, 54 Accordingly, the scheduler at va determines that both va and vb trigger their actions but the scheduler at vb determines that only vb triggers its action but va does not. Since the schedulers at va and vb need to coordinate with each other to determine what exactly they saw at the buffer, it is difficult to decide on the consistency and timing of their actions.

Benefits of TAW Over 'Ordered Data Writes'

The present invention can achieve agreement on the set of data written into the shared buffer by using programming primitives that order the data writes on the buffer over time. The temporal ordering is based on application-level prescription of the causal dependency relation among the data messages, combined with timing constraints. Referring back to FIG. 2, the causal dependency relation is: $\|\{d1, d3\} \rightarrow d2$. The temporal ordering may be transcribed onto the communication layer using 'vector clocks' [4] or 'message dependency graphs' [5] and incorporating timing constraints therein using the specification techniques described in [6,7,8,9]. But, having the communication layer order the data writes is an overkill in terms of timeliness and performance of data delivery, in comparison to the application layer synchronizing the data to the extent required. This is because an ordering imposed by the communication layer is indifferent to the asynchrony in data arrivals and/or the process computation times on dependent data. Therefore, an ordered write needs to stipulate a temporal constraint based on a worst-case data arrival pattern and a conservative estimate of the process computation times. Consequently, the use of ordered write primitive may incur an additional synchronization delay in many cases, with an ordered write of data equaling the performance of TAW only in the limiting case.

Case of 'Dataflow'-Structured Programs

Figure 6:
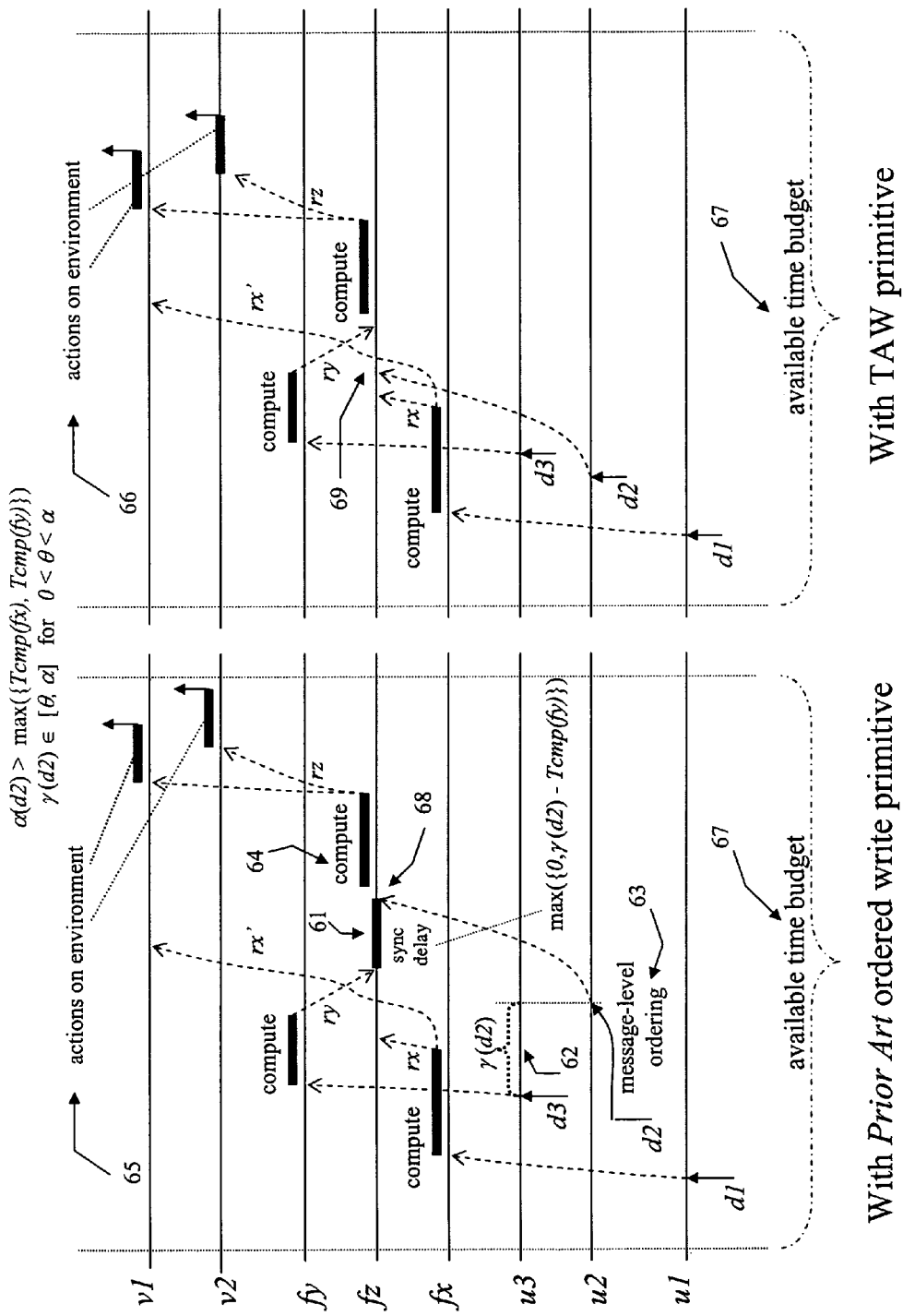
FIG. 6 is a representation of timing scenario to show TAW benefits of the present invention over a prior art ordered write.

Referring to FIG. 6, a timing scenario of the data arrivals and processing in the sample computation structure depicts the benefits of the present inventions TAW over prior art ordered write. The temporal constraint passed on from the application to the communication layer for an ordered write of d2 relative to d1 and d3 is:

$$\alpha > \max(\{Tcmp(fx), Tcmp(fy)\}),$$

where Tcmp( . . . ) denotes the computation time of a sub-task 62. The communication layer delivers d2 after a time of a has elapsed since the delivery of d1 and d3 63, 68. In comparison, the TAW primitive in the present invention allows the delivery of d2 to occur without any ordering constraint 69. Accordingly, the additional synchronization delay incurred by a prior art ordered write relative to the present invention TAW is:

$$\max(\{0, \max(\{Tarr(d1), Tarr(d3)\}) + \alpha - \max(\{[Tarr(d1) + Tcmp(fx)], [Tarr(d3) + Tcmp(fy)]\})\}),$$

where Tarr( . . . ) denotes the arrival time of a data 61.

Case of Monolithically Structured Programs

Figure 7:
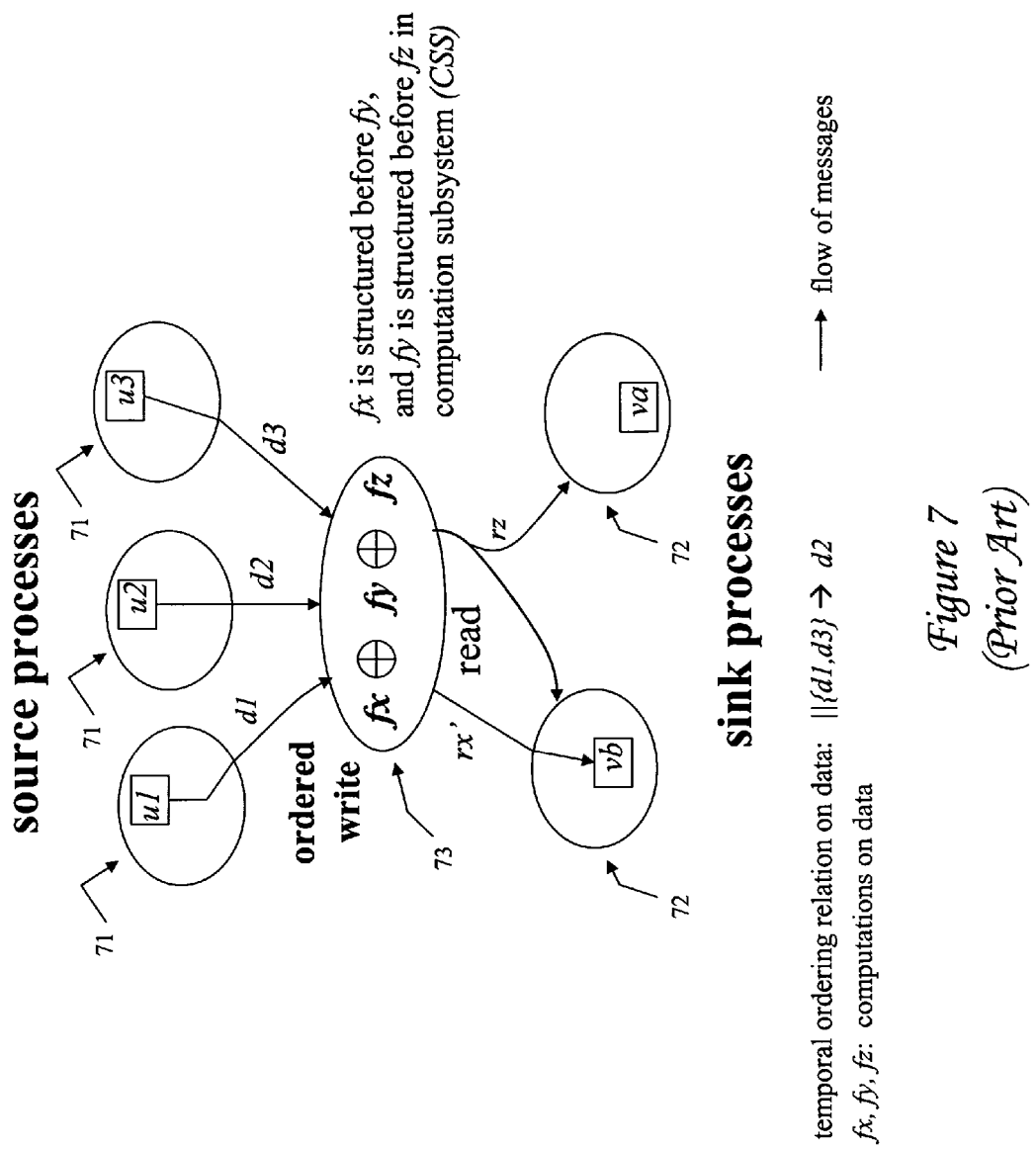
FIG. 7 is a graphical representation of monolithically structured prior art ordered write program for a sample application.
Figure 8:
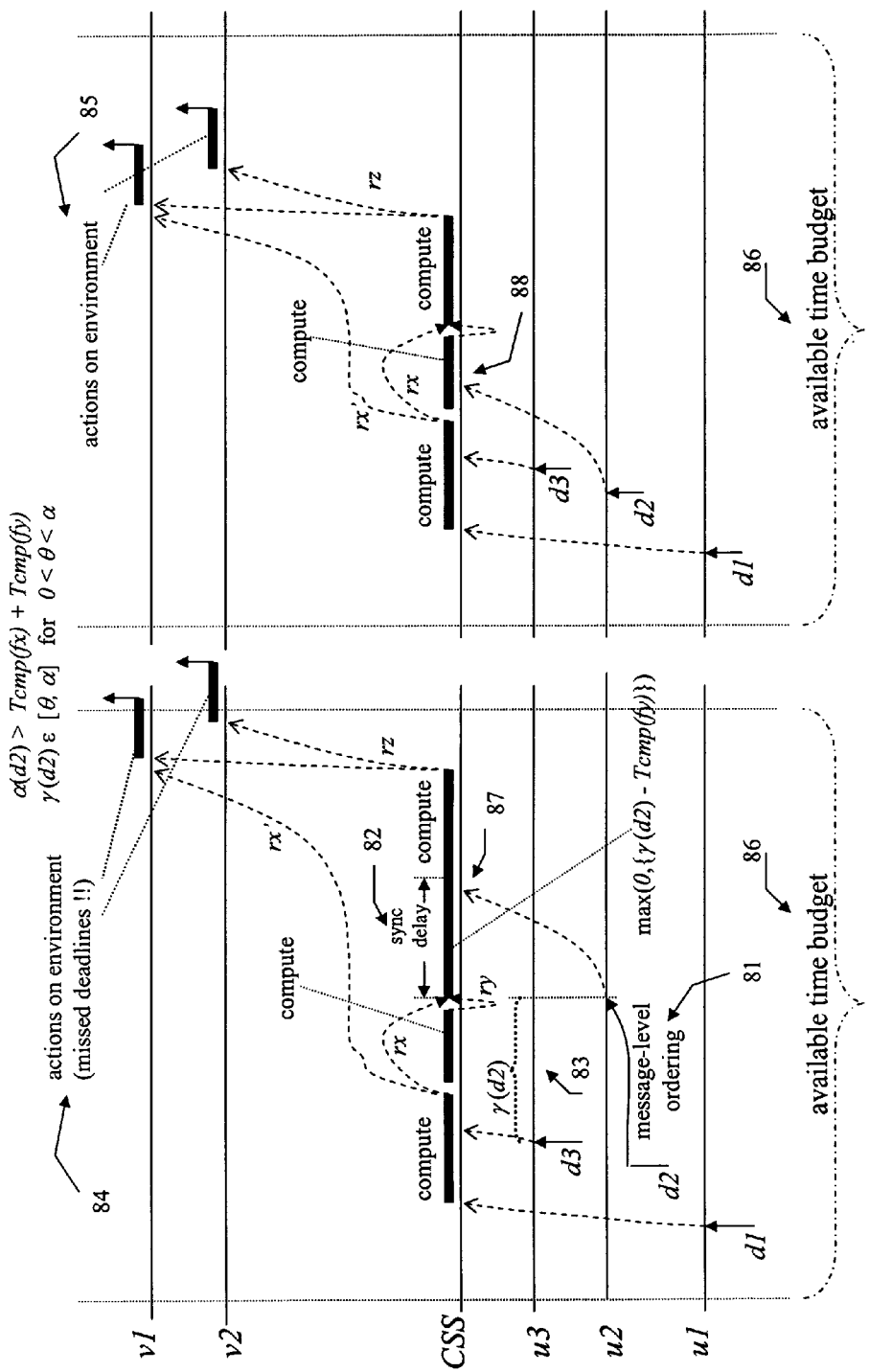
FIG. 8 is a graphical representation of a timing scenario to show the present invention's TAW benefits versus a prior art ordered write with monolithic program structures.

Referring to FIG. 7 and FIG. 8, a monolithically structured program for the sample computation (see FIG. 2) is depicted. Here, a rigid programming structure has the functions fx, fy and fz executed sequentially by a processing subsystem that is separate from the sensor and actuator modules 73. Here, the temporal constraint on the delivery of d2 is depicted in the prior art ordered write primitive 83 and in the present invention's TAW primitive 87:

$$\alpha > Tcmp(fx) + Tcmp(fy).$$

With a monolithic structure, the additional synchronization delay incurred by a prior art ordered write relative to the present invention's TAW is 82:

$$\max(\{0, \max(\{Tarr(d1), Tarr(d3)\}) + \alpha - \max(\{[Tarr(d1) + Tcmp(fx)], Tarr(d3)\}) + Tcmp(fy)\}).$$

As can be seen, even with a 'dataflow'-style program structure that offers the potential to reap the maximum performance, a prior art ordered write incurs additional synchronization delay over the present invention TAW primitive under normal cases.

FIG. 9 provides a table summarizing the performance benefits of the present invention's TAW primitive over a prior art ordered write primitive.

A Reference Code Skeleton in 'Dataflow'-Style Program Structure

Figure 10:
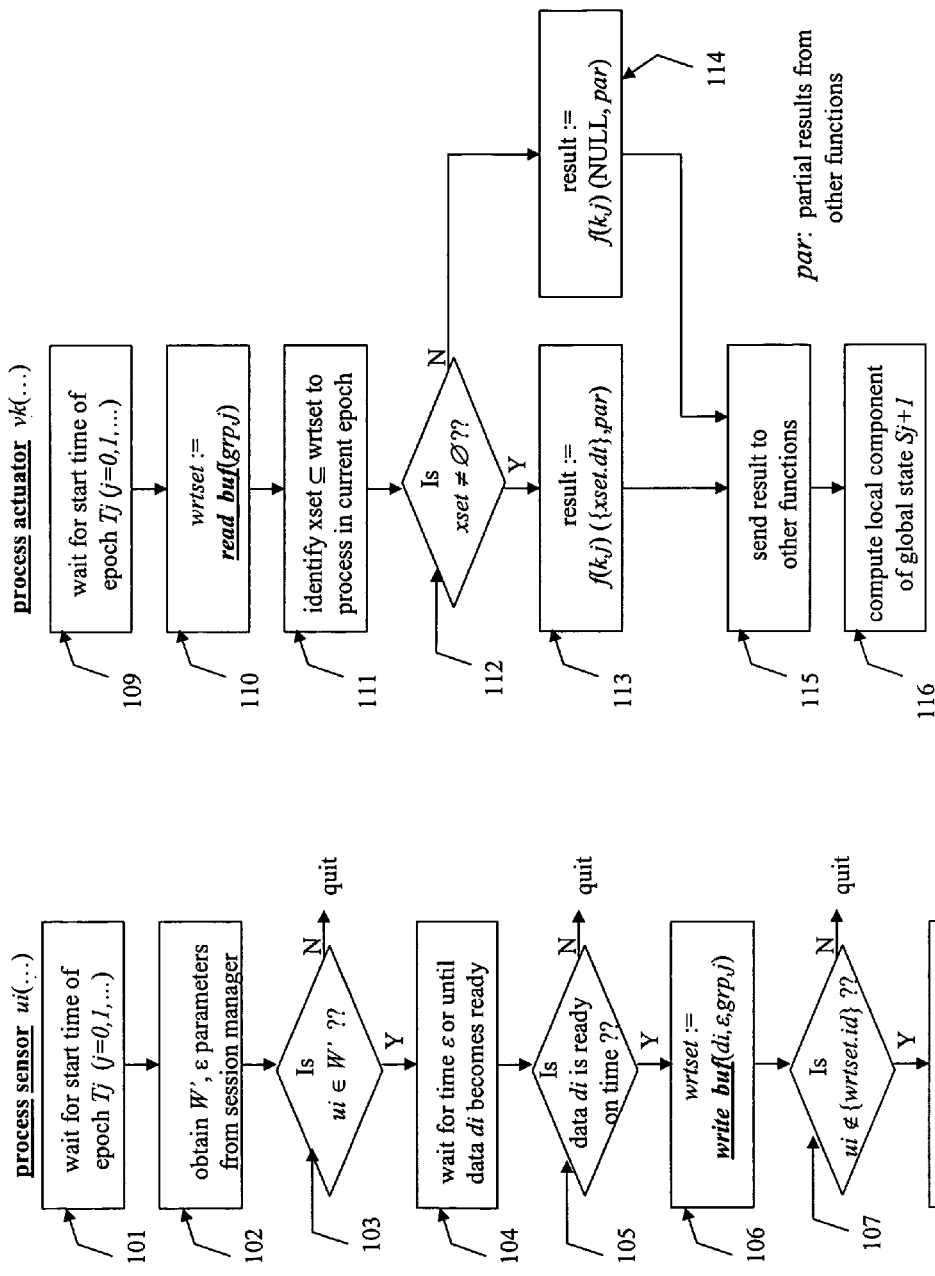
FIG. 10 depicts a flowchart of the process steps performed by the write_buf and read_buf programming primitives employed by the present invention's TAW.

Referring to FIG. 10, a real-time embedded application modeled as per the "produce-consume" style of computation may employ the write_buf and read_buf primitives as building blocks. The processing of a data d by an actuator vk be denoted by a function f(k,j)(d) where j indicates the epoch number. The global state Sj+1, as indicated, 116 is guaranteed to be consistent across all the processes, since the TAW primitive enforces an agreement on wrtset and Tj+1 among all the processes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a distributed data processing system, a software program method comprising a set of instructions, stored on a non-transitory computer-readable media, wherein said instructions, when executed by a computer, perform the necessary steps for timely processing time sensitive tasks executing data from data sources and by data sinks, comprising:
   writing at least one source's data di into a buffer as an unordered set during an epoch,
      wherein said step of writing further comprises agreeing among said data sources and said data sinks as to what data items have been written into said buffer, and
      prescribing a time budget for processing said at least one source's data so as to produce composite outputs;
   processing said at least one source's data from said buffer in data sinks;
   temporally ordering said at least one source's data during said epoch by enforcing state consistency and integrating the passage of real time in a degree specific to an application;
   partitioning a task into subtasks,
      wherein each of said subtasks represents an execution of at least one source's data from said data sources and said data sinks; synchronizing said subtasks' results;
   extracting parallelism in the execution of said subtasks, further comprising:
      a first step of identifying the functional dependencies between each said subtask and data needed for the execution of each said subtask;
      a second step of identifying task execution points requiring input of a sensor data item "x", wherein said sensor data item "x" comprises a distinct unit of data collection for input to said subtask, relative to the processing of other data items in the execution of said subtask;
         wherein said sensor data item "x" refers to said at least one source's data; scheduling said subtasks accordingly;
   computing said epoch according to $$\epsilon + \beta + \max(\{\zeta k\}), k=1, \ldots, M$$

where $\epsilon$ comprises the maximum time skew allowed between the data samples of various said data sources in a given epoch, $\beta$ comprises the time to process said data, $\zeta$ comprises the time to transition from the current said epoch to the next said epoch, and M is a counter which counts consecutive sink processes; and
   invoking by each of said data source ui( . . . ) a write_buf primitive after data di becomes available for processing, so as to form a wrtset of successful writes to said buffer during each said epoch, wherein $$wrtset := write\_buf(di, \epsilon, grp, e),$$

wherein wrtset comprises the set of successful writes on the buffer in said epoch e, wherein grp comprises a broadcast group address to which process p is subscribed to, wherein $\epsilon$ is a time-window over which the competing write requests are collected by a communication layer, and wherein write_buf is a programming primitive.

2. Method of claim 1, further comprising:
   a first step of defining the parameter wrtset as:

$$1 \leq |wrtset| \leq nwrt \leq |W'|$$

and a second step of defining the parameter nwrt as the maximum number of processes that are allowed to write to said buffer in a current epoch, wherein W denotes a set of data sources generating requests to write into the buffer, and wherein W' denotes a set of data sources from set W which are eligible to write.

3. Method of claim 1, further comprising the steps of:

```
waiting for the start time of said epoch Tj (j=0,1,...)
obtaining W' and ε parameters from session manager;
determining whether ui ∈ W';
    IF ui ∈ W', THEN
        waiting for either of said duration of time ε or until the
            availability of said data di;
        determining whether said data di is ready on time;
            IF said data di is ready on time, THEN
                computing wrtset := write buf(di,e,grp,j);
                determining whether ui ∉ {wrtset.id};
                    IF ui ∉ {wrtset.id}, THEN
                        deferring attempted write of said di to
                            said epoch j+1;
                    OTHERWISE;
                        ceasing processing data;
            OTHERWISE;
                ceasing processing data;
    OTHERWISE;
        ceasing processing data;
``` wherein ε is a time-window over which the competing write requests are collected by a communication layer; wherein W denotes a set of data sources generating requests to write into the buffer; wherein W' is a set of data sources from set W which are eligible to write, and wherein wrtset.id denotes a set of successful data writes on a buffer and the identification of the process which wrote said data.

4. Method of claim 1, further comprising invoking by each of said data sink a read_buf primitive so as to read said buffer, wherein $$wrtset:=read\_buf(grp, e)$$

wherein wrtset comprises the set of successful writes on the buffer in said epoch e, wherein grp comprises a broadcast group address to which process p is subscribed to, and wherein read_buf is a programming primitive.

5. Method of claim 4, further comprising the steps of:

```
waiting for the start time of said epoch Tj (j=0,1,...);
computing wrtset := read buf(grp,j);
identifying xset ⊆ wrtset to process in current said epoch;
determining whether xset ≠ ∅;
    IF xset ≠ ∅; THEN
        computing result := f(k,j) ({xset.dt},par);
        sending result to other functions;
        computing local component of global state Sj+1
        ceasing processing data;
    OTHERWISE,
        computing result := f(k,j) (NULL, par);
        sending result to other functions;
        computing local component of global state Sj+1; and
        ceasing processing date
``` wherein
xset is a subset of sensor identifications whose data is written into said buffer;
xset.dt is the set of actual data items written into said buffer; f(k,j) is a function embodied into a data sink where k represents a $k^{th}$ data sink and j represents an epoch number; and
par represents any additional variable used in said step of processing said data.

6. In a distributed data processing system, a computer apparatus and a set of software code, said software code comprising a set of instruction stored on a non-transitory computer-readable media being executable within said computer apparatus so as to timely process time sensitive tasks executing data from data sources and by data sinks input thereinto by providing means for:

writing at least one source's data di into a buffer as an unordered set during an epoch,
    wherein said means for writing further comprises means for agreement among said data sources and said data sinks as to what data items have been written into said buffer, and
    means for prescribing a time budget for processing said at least one source's data so as to produce composite outputs;
processing said at least one source's data from said buffer in data sinks; temporally ordering said at least one source's data during said epoch by enforcing state consistency and integrating the passage of real time in a degree specific to an application; partitioning a task into subtasks:
    wherein each of said subtasks represents an execution of data from
said data sources and said data sinks;
synchronizing said subtasks' results;
extracting parallelism in the execution of said subtasks, further comprising:
    a first step of identifying the functional dependencies between each said subtask and data needed for the execution of each said subtask;
    a second step of identifying task execution points requiring input of a sensor data item "x", wherein said sensor data item "x" comprises a distinct unit of data collection for input to said subtask, relative to the processing of other data items in the execution of said subtask;
    wherein said sensor data item "x" refers to said at least one source's data;
scheduling said subtasks accordingly;
computing said epoch according to $$\epsilon+\beta+\max(\{\zeta k\}), k=1,\ldots,M$$

where ε comprises the maximum time skew allowed between the data samples of various said data sources in a given epoch, β comprises the time to process said data, comprises the time to transition from the current said epoch to the next said epoch, and M is a counter which counts consecutive sink processes; and
computing by each of said data source a write_buf primitive after data di becomes available for processing, so as to form a wrtset of successful writes to said buffer during each said epoch, wherein $$wrtset:=write\_buf(di, \epsilon, grp, e),$$

wherein wrtset comprises the set of successful writes on the buffer in said epoch e, wherein grp comprises a broadcast group address to which process p is subscribed to, wherein ε is a time-window over which the competing write requests are collected by a communication layer, and wherein write_buf is a programming primitive.

7. The computer apparatus and set of software code as in claim 6, further comprising:
a first means for defining the parameter wrtset as:

$$1 \leq |wrtset| \leq nwrt \leq |W'|; \text{ and}$$

a second means for defining the parameter nwrt as the maximum number of processes that are allowed to write to said buffer in a current epoch, wherein W denotes a set of data sources generating requests to write into the buffer, and wherein W' denotes a set of data sources from set W which are eligible to write.

8. The computer apparatus and set of software code as in claim 6, further comprises means for:

---
waiting for the start time of said epoch Tj (j=0,1, ...)
obtaining W' and $\epsilon$ parameters from session manager;
determining whether ui W';
  IF ui W', THEN
    waiting for either of said duration of time $\epsilon$ or until the availability of said data di;
      determining whether said data di is ready on time;
        IF said data di is ready on time, THEN
          computing wrtset := write_buf (di, e, grp, j);
          determining whether ui $\notin$ {wrtset. id} ;
          IF ui $\notin$ {wrtset. id}, THEN
            deferring attempted write of said di to said epoch j+1;
          OTHERWISE;
            ceasing processing data;
        OTHERWISE;
          ceasing processing data;
  OTHERWISE;
    ceasing processing data;
--- wherein $\epsilon$ is a time-window over which the competing write requests are collected by a communication layer; wherein W denotes a set of data sources generating requests to write into the buffer; wherein W' is a set of data sources from set W which are eligible to write, and wherein wrtset.id denotes a set of successful data writes on a buffer and the identification of the process which wrote said data.

9. The computer apparatus and set of software code as in claim 6, further comprising means for invoking by each of said data sink a read_buf primitive so as to read said buffer, wherein wrtset:=read_buf(grp, e)

wherein wrtset comprises the set of successful writes on the buffer in said epoch e and wherein grp comprises a broadcast group address to which process p is subscribed to, and wherein read_buf is a programming primitive.

10. The computer apparatus and set of software code as in claim 9, further comprises means for:

---
waiting for the start time of said epoch Tj (j=0, 1, ...);
computing wrtset := read_buf(grp,j);
identifying xset $\subseteq$ wrtset to process in current said epoch;
determining whether xset $\neq \emptyset$;
  IF xset $\neq \emptyset$; THEN
    computing result := f(k,j) ( {xset.dt},par);
    sending result to other functions;
    computing local component of global state Sj+1
    ceasing processing data;
  OTHERWISE,
    computing result := f(k,j) (NULL,par);
    sending result to other functions;
    computing local component of global state Sj+1; and
    ceasing processing data
--- wherein
  xset is a subset of sensor identifications whose data is written into said buffer;
  xset.dt is the set of actual data items written into said buffer;
  f(k,j) is a function embodied into a data sink where k represents a $k^{th}$ data sink and j represents an epoch number; and
  par represents any additional variable used in said step of processing said data.

\* \* \* \* \*